W. F. Stanley.
Stable Stanchion
No. 83,738. Patented Nov. 3, 1868.
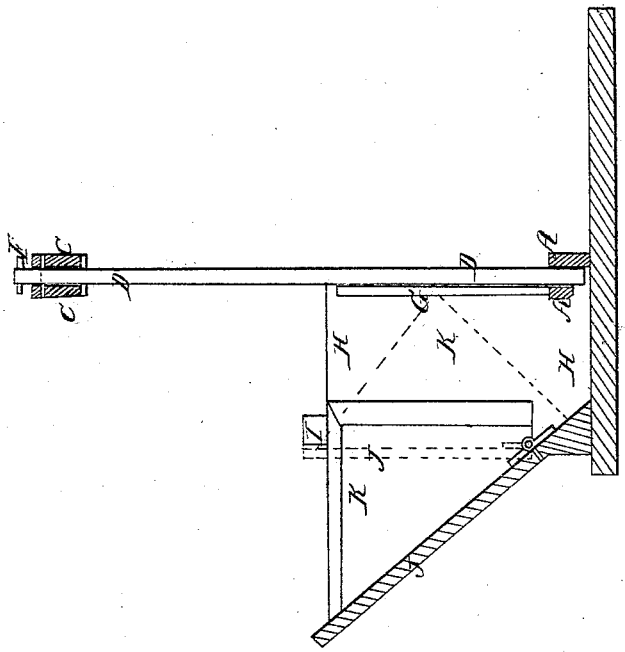
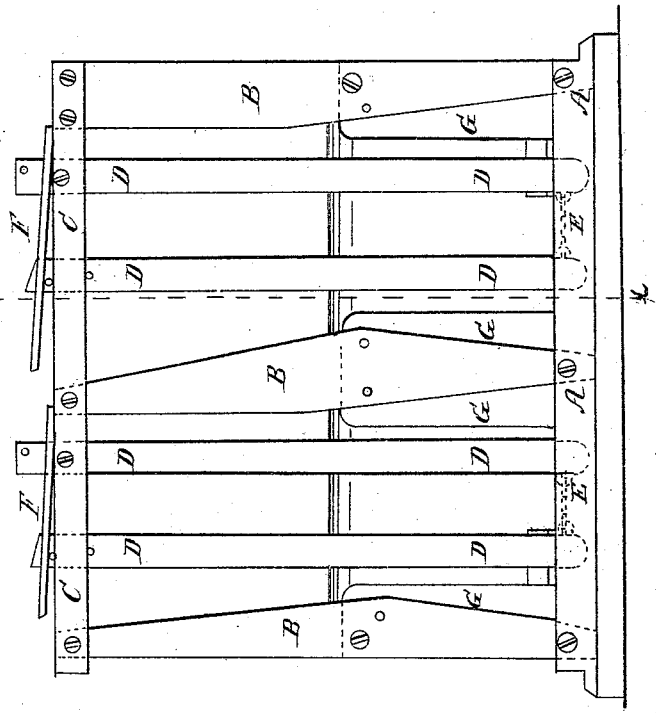
Witnesses;
Wm. A. Morgan
G. E. Cotton
Inventor;
W. F. Stanley
per Murphy & Co.
Attorney

WILBUR F. STANLEY, OF CAZENOVIA, NEW YORK.

Letters Patent No. 83,738, dated November 3, 1868.

IMPROVEMENT IN MANGERS.

The Schedule referred to in these Letters Patent and making part of the same.

*To all whom it may concern:*

Be it known that I, WILBUR F. STANLEY, of Cazenovia, in the county of Madison, and State of New York, have invented a new and useful Improvement in Mangers; and I do hereby declare that the following is a full, clear, and exact description thereof, which will enable those skilled in the art to make and use the same, reference being had to the accompanying drawing, forming part of this specification, in which—

Figure 1 is a front view of my improved manger.

Figure 2 is a vertical cross-section of the same, taken through the line *x x*, fig. 1.

Similar letters of reference indicate corresponding parts.

My invention has for its object to furnish an improved manger for cattle, which shall be so constructed and arranged, that each animal may eat by itself, and can lie down and get up easily, which shall prevent the animals from reaching after and taking the feed from each other, and which shall be perfectly easy, safe, and secure.

A are the base-bars of the frame;

B are the vertical bars; and

C are the top bars.

D are the neck-bars, the lower ends of which entering the space between the base-bars or planks A, are connected to each other by pivoted links, chains, or bars E, so as to be at the proper distance apart to receive the necks of the cattle.

The upper end of one of each pair of neck-bars D is pivoted between the top bars C, by a pin or bolt passing through a hole in said top bars, and through a hole in the upper end of said neck-bar.

The upper end of the other one of each pair of neck-bars D is pivoted in the space between the top bars C, by two pins passing through the said neck-bar, the one above and the other below the said top bars C, as shown in figs. 1 and 2, so that the said upper end of the said bar may be moved outward, to allow the cattle to put their heads through and remove them from the neck-bars, and may be moved inward to secure the animal in place.

F is a lock-bar, which has holes formed through it, near its ends, to receive the upper ends of the neck-bars D, The lock-bar F is secured in place upon the upper end of the stationary pivoted neck-bar, by a pin passing through the upper end of the said neck-bar, at such a distance above the said lock-bar as will allow the other end of the lock-bar to be raised to release or secure the upper end of the sliding pivoted neck-bar.

This construction and arrangement of the neck-bars allow the lower ends of the neck-bars D to swing laterally, so that the cattle can conveniently reach all parts of the manger.

G are guard-boards to prevent the feed from getting out of the manger, or impeding the movement of the swinging neck-bars.

The manger is divided up into spaces of the proper length, by partitions H, attached to the frame of the manger, or to the studs I, or to both.

I claim as new, and desire to secure by Letters Patent—

The suspended pivoted neck-bars D, constructed, arranged, and operating substantially in the manner herein shown and described, and for the purposes set forth.

The above specification of my invention signed by me, this 23d day of May, 1868.

WILBUR F. STANLEY.

Witnesses:
JOSEPH H. STANLEY,
E. S. CARD.